United States Patent [19]

Fleischer

[11] Patent Number: 5,791,675
[45] Date of Patent: Aug. 11, 1998

[54] BICYCLE TRAINING DEVICE

[76] Inventor: Steven Fleischer, 5 Wetherill Dr., Freehold, N.J. 07728

[21] Appl. No.: 610,057

[22] Filed: Feb. 29, 1996

[51] Int. Cl.⁶ ................................................ B62H 1/10
[52] U.S. Cl. .................................. 280/293; 280/298
[58] Field of Search ............................ 280/293, 288.4, 280/295, 292, 298, 47.34, 47.371

[56] References Cited

U.S. PATENT DOCUMENTS

| | | |
|---|---|---|
| 3,437,351 | 4/1969 | Newbern . |
| 3,595,599 | 7/1971 | Black . |
| 3,650,544 | 3/1972 | Cassell . |
| 4,730,840 | 3/1988 | Goldmeier . |
| 4,903,975 | 2/1990 | Weishrodt et al. . |
| 4,917,398 | 4/1990 | de Miranda Pinto . |
| 5,028,066 | 7/1991 | Garth . |
| 5,154,096 | 10/1992 | Geller et al. . |
| 5,176,395 | 1/1993 | Garforth-Bles . |
| 5,217,240 | 6/1993 | Gardenhour, Jr. et al. . |
| 5,242,183 | 9/1993 | Oberg et al. . |
| 5,259,638 | 11/1993 | Krauss et al. . |
| 5,303,944 | 4/1994 | Kalmus . |
| 5,306,030 | 4/1994 | Becka . |
| 5,338,204 | 8/1994 | Herndon . |
| 5,344,171 | 9/1994 | Garforth-Bles . |
| 5,395,130 | 3/1995 | Rubin . |
| 5,407,222 | 4/1995 | Harrison . |

FOREIGN PATENT DOCUMENTS

| | | |
|---|---|---|
| 2512767 | 3/1983 | France . |
| 2600963 | 1/1988 | France . |
| 2668744 | 5/1992 | France . |
| 28 30 561 A1 | 1/1980 | Germany . |
| 29 24 798 A1 | 1/1981 | Germany . |
| 2 238 282 | 5/1991 | United Kingdom . |

OTHER PUBLICATIONS

Leaflet, Kettler Toys.

*Primary Examiner*—Paul N. Dickson
*Attorney, Agent, or Firm*—Fisher, Christen & Sabol

[57] ABSTRACT

A bicycle training device used on a bicycle provides a user or trainer with the ability to safely and effectively supervise a rider in gaining steering and balance skills. The device is generally U-shaped with a forwardly-disposed handle at the top. The U-shaped handle is connected to the supporting legs by two curved portions. The supporting legs are fixedly attached to the rear of the bicycle at a suitable location such as the rear axle. The device enables the user or trainer to guide the bicycle and rider safely and without exerting undue forces on the bicycle by providing a multiplicity of comfortable and accessible gripping points. These separated gripping portions are available for each hand of the user and the user may guide, push or pull the device from the left side, right side or rear of the bicycle. The device is preferably of unitary tubular construction. It preferably has at least a portion, most preferably, substantially all of its outer surface covered with a cushioning material.

20 Claims, 4 Drawing Sheets

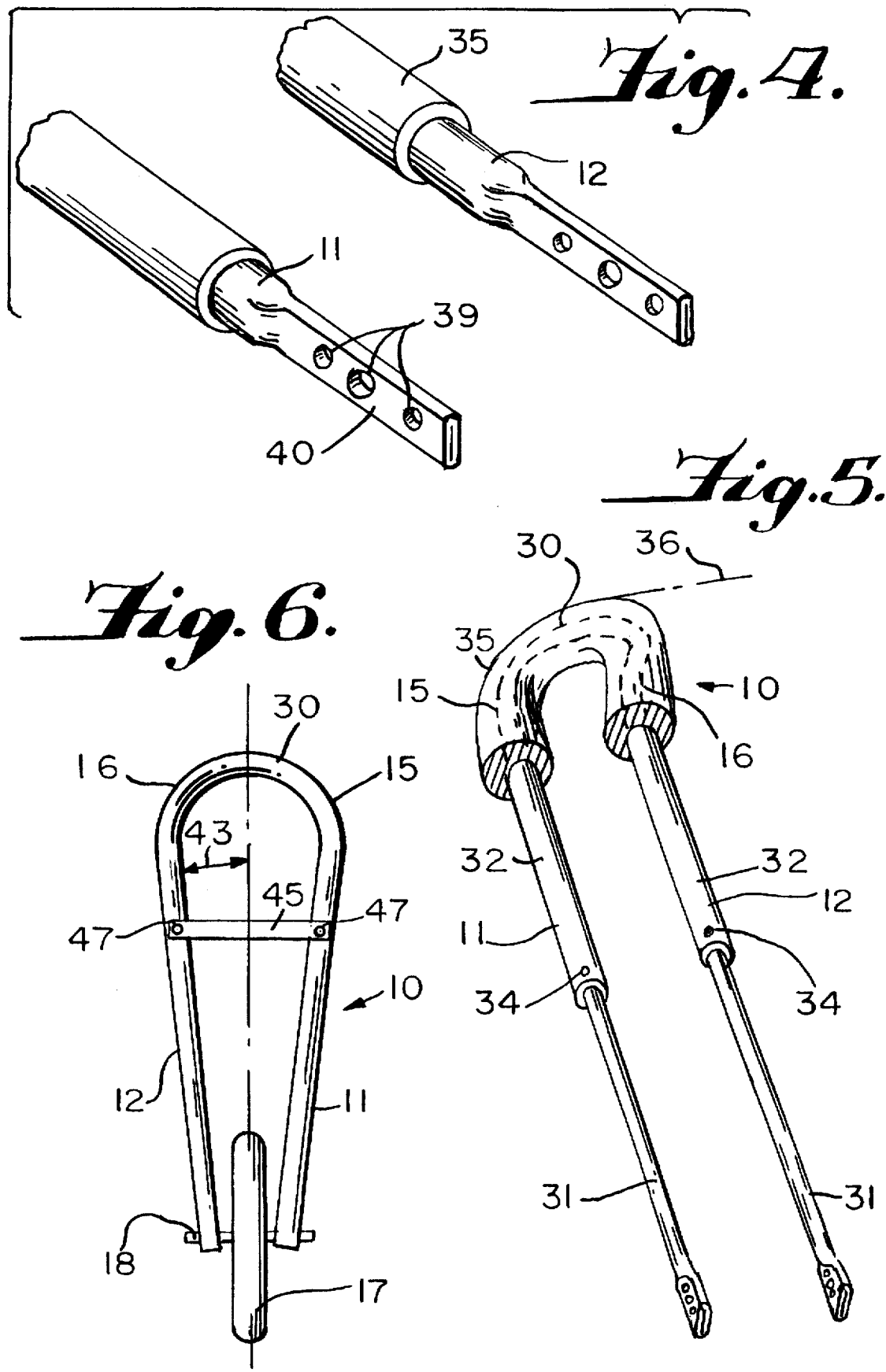

BICYCLE TRAINING DEVICE

FIELD OF THE INVENTION

The present invention relates to a device for assisting and training a bicycle rider in riding a two wheel bicycle.

BACKGROUND OF THE INVENTION

Learning to ride a two wheel bicycle requires the rider to simultaneously learn how to balance and steer the bicycle. Ideally, a bicycle training device should allow the bicycle rider to practice bicycle riding skills while preventing injury. It should also be comfortable and convenient to use for the trainer, and not require bending or straining in awkward positions. The bicycle training device should be designed so it does not interfere with the balance of the rider during training. Thus, it should be small and lightweight, as well as easy to grip and control. It should also be adaptable to various bicycle sizes and designs, and cooperate with other training devices or attachments, for example, training wheels. A minimum of effort to install and remove the device is also desirable.

Often, the parent or other bicycle trainer steadies the child by placing a hand on the bicycle, usually by grasping the rear portion of the bicycle seat. This requires the adult to walk in a stooped or bent-over posture. This posture is tiresome, and it is difficult to stay with the child as the speed of the bicycle increases. This can cause the parent to have to run alongside the bicycle while stooped over, which is quite difficult. Also, it is difficult to properly balance the bicycle, because the parent is generally behind the bicycle and does not have the advantage of leverage in applying force to guide and steady the bicycle. Furthermore, because the parent is behind the bicycle and cannot reach the handlebars, it is not possible to assist the rider with steering.

Training wheels are a common method of allowing a new rider to learn to ride a bicycle. However, training wheels do not require any balancing effort on the part of the bicycle rider because they simply transform an unstable bicycle into a stable, four-wheeled vehicle. Training wheels allow the child or other bicycle trainee to become accustomed to the position and feel of the bicycle without the risk of falling. However, the child or other bicycle trainee often tends to rely on the training wheels and leans to one side of the bicycle, thus acquiring the habit of riding the bicycle without learning to balance. The training rider does not truly experience the proper balance and normal maneuvers required to properly ride the bicycle until after removal of the training wheels.

A number of devices are available for guiding bicycles. U.S. Pat. No. 4,917,398 to De Veranda Pinto discloses a bicycle training handle where the handle (10) is oriented or disposed toward the front of the bicycle with respect to the vertically oriented training handle (2). However, the device of U.S. Pat. No. 4,917,398 is not U-shaped at the top portion and does not provide separated gripping portions for each hand of the user.

Bicycle training devices which have a U-shaped section which is oriented rearwardly or in line with respect to the supporting legs of the device are disclosed in U.S. Pat. Nos. 3,595,599 to Black, 4,730,840 to Goldmeier, 4,903,975 to Weishrodt, et al., 5,028,066 to Garth, 5,395,130 to Rubin, 5,407,222 to Harrison, and French Patent No. 2,600,963 (published Jan. 8, 1988).

U.S. Pat. Nos. 5,176,395 and 5,344,171 to Garforth-Bles show a U-shaped handle with its top portion disposed forwardly with respect to the longitudinal axis of its supporting rods. However, the device is for a 3-wheeled vehicle for carriage of children which may be converted between a jogging and bicycle trailer configuration. See FIG. 3A.

German Patent Publication No. 2830651 (published Jan. 31, 1980) discloses a U-shaped bolt arrangement for attaching a single rod to a seat post as shown in FIGS. 1, 2 and 3. However, the training handle itself is not U-shaped.

Bicycle training devices which have a single rod at their upper portions are disclosed, for example, in U.S. Pat. Nos. 3,437,351, 3,650,544, 5,154,096, 5,303,944, 5,306,030, 5,338,204, UK Patent Publication No. GB2238282A (published May 29, 1991), German Patent Publication No. 2924798 (published Jan. 22, 1981), French Patent Publication No. 2,600,963 (published Jan. 8, 1988), French Patent Publication No. 2,668,744 (published May 7, 1992), and French Patent Publication No. 2,512,767 (published Mar. 18, 1983).

A training device with a telescoping handle is disclosed in U.S. Pat. No. 5,303,944 to Kalmus. U.S. Pat. No. 5,217,240 to Gardenhour, Jr., et al. discloses a tricycle push stick.

The present invention provides a bicycle training device with separated gripping portions for each hand of the user or trainer. The forward-tilting U-shaped handle of the U-shaped bicycle training device allows the device to be grasped from either the left side or the right side. The legs allow the device to be grasped from behind the bicycle. The present invention also provides a bicycle training device which may be pushed or pulled without strain to the user or trainer because the multiplicity of gripping areas provided by the device enable the user or trainer to select the most comfortable position from which to apply a guiding force. Little or no unnecessary additional forces are exerted on the bicycle by the bicycle training device because the user or trainer is able to push, pull or exert control from a comfortable position, as opposed to being required to bend or twist the hand or lean over in order to grasp a horizontally or vertically oriented handle.

SUMMARY OF THE INVENTION

The present invention provides a U-shaped training device for a bicycle. The bicycle training device has a U-shaped handle portion which tilts forward with respect to the horizontal axis of the legs that support it. The U-shaped handle is connected to the supporting legs by two curved portions, one on each leg, having a radius of curvature and a curvature angle which function to define the amount and extent that the U-shaped handle portion tilts forward. The legs are secured to the rear axle of the bicycle in a fixed manner, either by bolting or by other means. The legs may be easily attached to the bicycle by using the rear axle and the rear axle bolts. In embodiments of the invention, the bicycle training device has length adjustable legs, which allow the total height of the bicycle and the attached device to be adjusted from between about 28 inches to about 48 inches in height, relative to a reference point at ground level. In order to facilitate easily and comfortably gripping and controlling the device, at least a portion, preferably substantially all, of the bicycle training device may be covered with a flexible, cushioning material.

The bicycle training device may also include support members or braces which are fixedly attached near the bottom portion of the legs, and extend to and are fixedly attached to the bicycle frame in the vicinity of the rear axle. These supports or braces may be attached to either leg of the device, or to both legs.

The bicycle training device may be grasped by the user or trainer from either the left hand side or the right hand side to guide, push, or pull the device without exerting additional forces on the bicycle which would tilt the front wheel upwardly. The two-legged design which terminates in a forwardly orientated U-shaped handle provides for comfortable, safe, pulling, pushing or guiding of the device and the bicycle from a convenient position. The bicycle training device may also be pushed from behind with the trainer directly behind the rear wheel. This may be particularly advantageous in the event the rider is tired, or on uphill terrain. One hand or two hands may be used to push the two legs of the bicycle training device from behind. The forwardly disposed U-handle of the present invention enables the trainer or user to comfortably grasp the device without straining the arm or wrist to a cocked position. The separated gripping portions of the bicycle training device not only provide a multiplicity of areas for the user to grasp, but also allow the user to choose whether to use one or two hands to guide the bicycle with the device.

BRIEF DESCRIPTION OF THE DRAWINGS

FIG. 4 is a partial schematic side view showing the bottom portion of the legs of an embodiment of the invention.

FIG. 5 is a schematic side view of an embodiment of the invention including height adjustment.

FIG. 6 is a rear view of a device of the present invention.

DETAILED DESCRIPTION OF THE INVENTION

A bicycle rider can learn how to simultaneously balance and steer a bicycle with the assistance of a trainer using the bicycle training device in accordance with the present invention. The bicycle training device has a U-shaped handle, forwardly disposed with respect to the longitudinal axis of its supporting legs, which provides a multiplicity of separated gripping portions for each hand of the user. The bicycle training device in accordance with the present invention may be grasped from any hand angle, and from the front, rear, and side. The trainer may comfortably push or pull the device without straining from an awkward angle which can cause additional forces, such as upward tilting forces, to be exerted on the bicycle as a result of such uncoordinated guidance.

Figure 1:
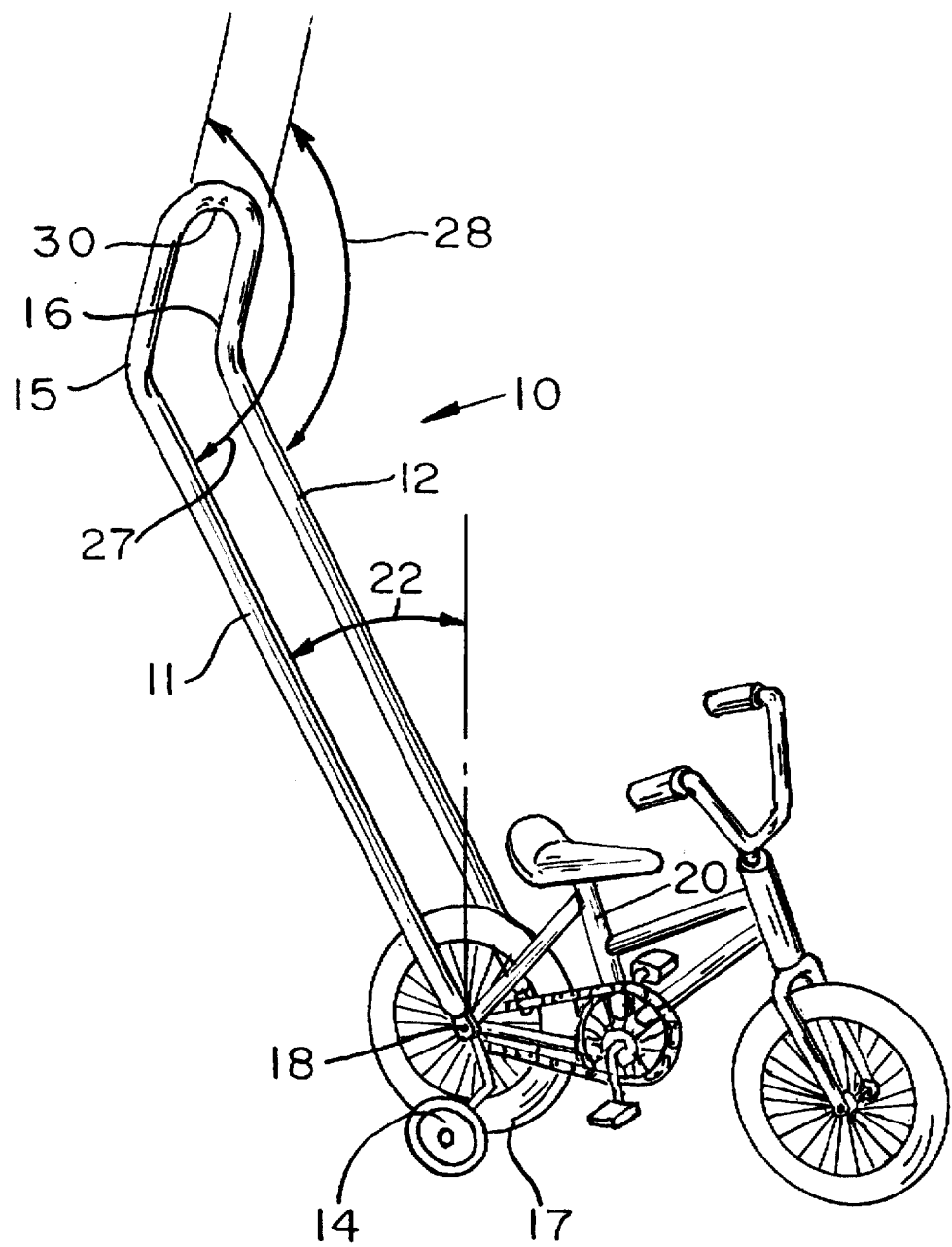
FIG. 1 is a schematic side view of the bicycle training device of the present invention installed on a small child's bicycle.
Figure 2:
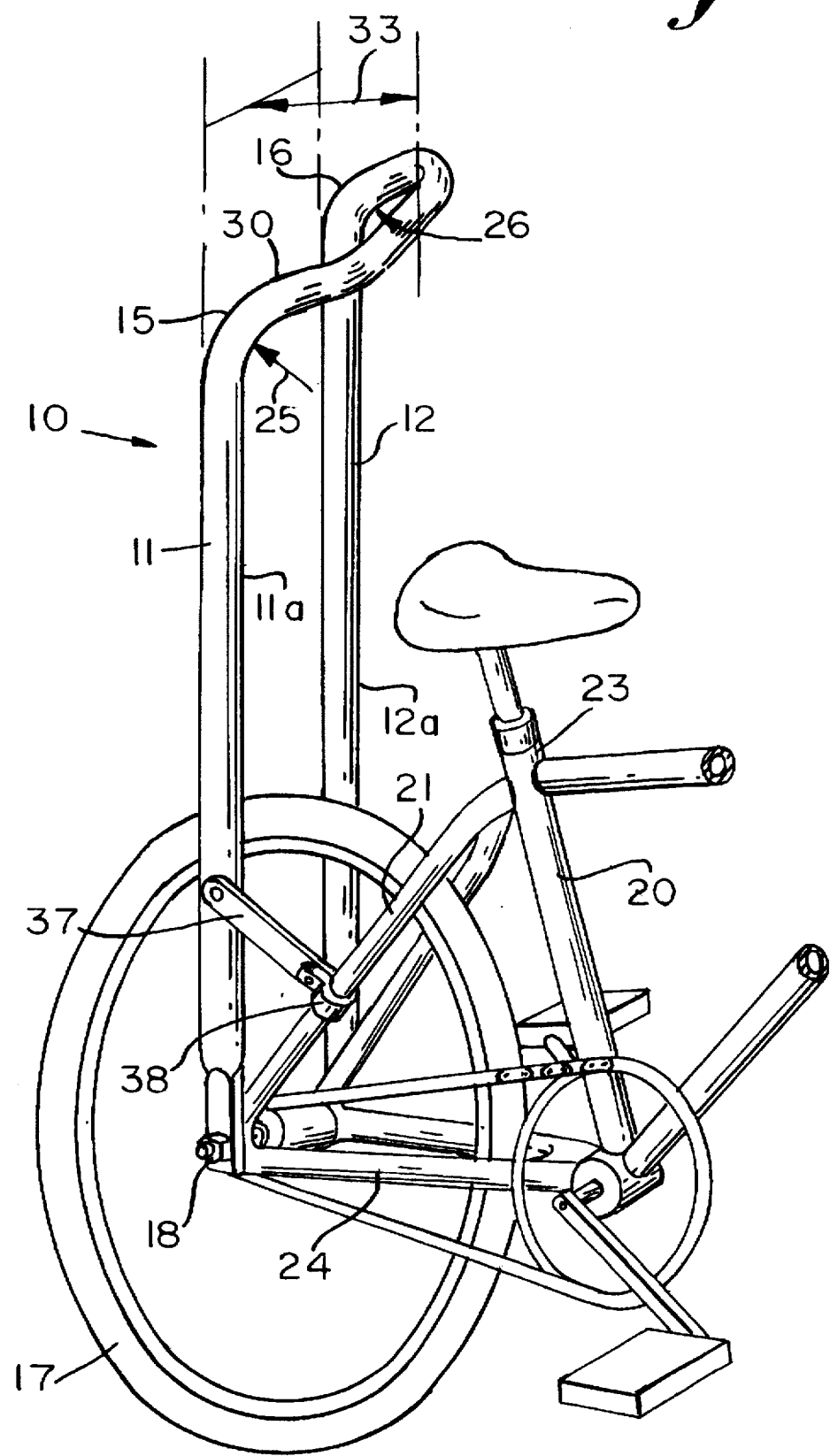
FIG. 2 is a schematic side view of an embodiment of the present invention including a support member.
Figure 3:
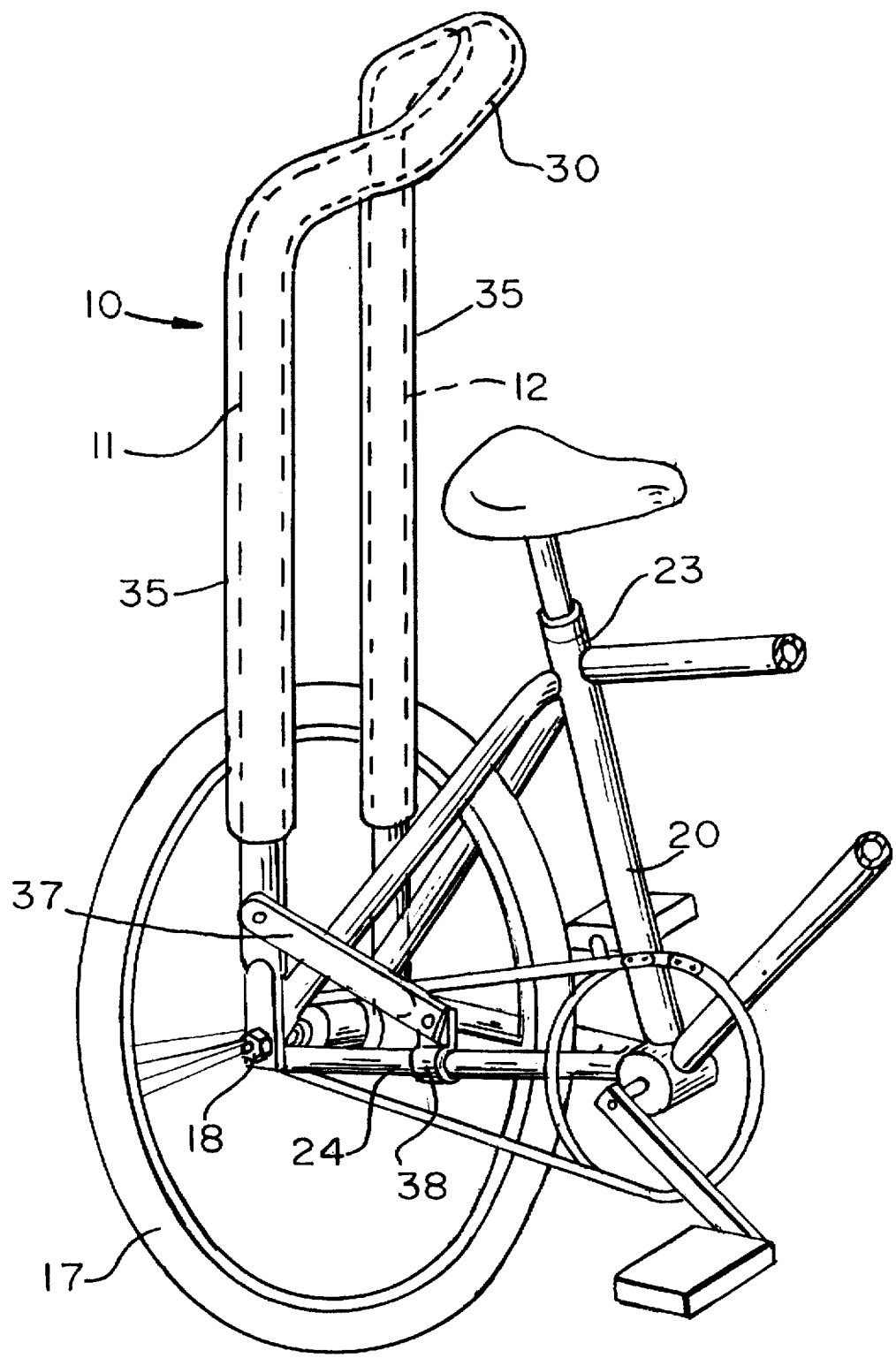
FIG. 3 is a schematic side view of an embodiment of the present invention including a support member and cushioning material.

As shown in FIGS. 1, 2, 3, 5 and 6, the bicycle training device 10 in accordance with the present invention comprises two upright legs 11 and 12 attached to the rear of the bicycle, preferably at the point of attachment of the rear wheel 17 and rear wheel axle 18 to the bicycle frame 20. Depending on the particular installation, the legs 11 and 12 may be substantially vertical, as shown in FIGS. 2 and 3, or may be tilted at a rearward tilt angle 22 of from about 0° to about 50°, preferably from about 20° to about 30°, from a vertical plane, as shown in FIG. 1. The adjustment of the rearward tilt angle 22 facilitates the use of the bicycle training device 10, with a variety of bicycle designs, including bicycles with training wheels 14 attached, as shown in FIG. 1. Thus, for example, the device 10 may be tilted rearward enough so that the trainer does not come into contact with the training wheels 14 while guiding the bicycle training device 10 from either side or from behind.

If the rearward tilt angle 22 is too high it may adversely affect stability or guidability of the bicycle unless training wheels are attached. Generally, training wheels 14 should be attached for rearward tilt angles 22 above about 30° to provide stability when the bicycle is riden without a training person.

The legs 11 and 12 extend upward and transition into curved portions 15 and 16 which curve from the front side 11a, 12a of each leg 11, 12 in the forward direction of travel of the bicycle. Each curved portion 15, 16 comprises an inner radius of curvature 25 and 26, respectively. Each radius of curvature defines a respective forwardly-disposed curvature angle 27 and 28, respectively, which are forwardly disposed with respect to the longitudinal axes of legs 11 and 12, respectively. Depending on the configuration desired, the forwardly-disposed curvature angle 27 and 28 may be from about 90° to about 150°, more preferably from about 110° to about 130°. Each radius of curvature 25 and 26 may vary from about 1 inch to about 10 inches, depending upon the particular configuration desired.

The U-shaped handle 30 is connected to each curved portion 15 and 16, resulting in a multiplicity of gripping surfaces being available to the user or trainer on the legs, curved portions or U-shaped handle of the device. The U-shaped handle portion 30 is forwardly-disposed at the curvature angles 27 and 28. As shown in FIG. 2, the forward extension distance 33 that the U-shaped handle 30 is forwardly-disposed from a plane coincident with both longitudinal axes of legs 11 and 12 is related to the dimensions of the U-shaped handle 30 and each radius of curvature 25 and 26 and each of curvature angles 27 and 28. Each radius of curvature and each curvature angle may be the same or different, i.e., the device 10 may be symmetrical or asymmetrical with respect to the plane rear wheel 17 lies in. Identical radii and curvature angles which provide a symmetrical device are preferred. Generally, the forward extension distance 33 measured horizontally from the plane formed by legs 11 and 12 to the forwardmost portion or midpoint of the U-shaped handle is in the range of about 2 inches to about 18 inches, more preferably from about 4 inches to about 12 inches.

In preferred embodiments, the legs 11, 12, curved portions 15, 16 and U-shaped handle 30 are integral. The shape may be formed from a single tube using conventional pipe or tube bending or curving equipment in known manner. The device may be made of tubular plastic material, but is preferably made of metal tubing. The bicycle training device comprising a U-shaped handle, curved portions and legs may be manufactured from any other suitable lightweight, rigid material which is effective to exert control over the bicycle, without adding substantial additional weight.

As shown in FIG. 5, the bicycle training device 10 may comprise means for adjusting the length of each of the legs. Any suitable means of adjustment may be used, such as a telescoping arrangement comprising an inner tube 31 with a smaller diameter and an outer tube 32 with a larger diameter, with conventional threaded height adjustment knobs 34 on the outer portion or inner portion of each leg to fix the legs in place at the desired height. In embodiments of the invention the height of the uppermost point of the bicycle training device 36 may be adjusted from about 28 inches to about 48 inches, with respect to a reference point on the ground.

In preferred embodiments of the invention, at least a portion of the bicycle training device 10 may be covered with a flexible cushioning material 35, which enhances and facilitates the ability of the user or trainer to comfortably grip and control the device 10. As shown in FIG. 5, the portion of the bicycle training device 10 which is covered by the flexible, cushioning material 35 may comprise the upper portion of the legs 11 and 12, the curved portions 15 and 16, and the U-shaped handle 30. In other embodiments of the invention, the bicycle training device 10 may be almost completely covered with a flexible cushioning material 35, as shown in FIG. 3. Depending upon the particular needs of the trainer or user, and the type of bicycle the device is installed on, other portions of the device may be covered with a flexible cushioning material such as only the legs 11 and 12, or the U-shaped handle 30, or other portions of the device 10. The flexible cushioning material 35 functions to provide a multiplicity of comfortable gripping surfaces to the user or trainer while simultaneously enabling the trainer or user to effectively control the bicycle while using the device 10. Many plastic or rubber materials are suitable, such as polyurethane or silicone, and foam rubber is preferred.

As shown in FIG. 2, the bicycle training device 10 may include at least one support member 37 attached near the bottom portion of one of the legs 11. The support member may be straight, bent or curved to accommodate attachment between the legs 11, 12 and bicycle frame 20. In the embodiment shown, the support member 37 is bolted to the lower portion of the leg 11 and extends to the upper bicycle frame member 21 which extends from the rear wheel axle 18 to the seat post section 23 of the frame 20. The support member 37 is rigidly fixed to the upper bicycle frame 21 by the use of a U-clip 38 surrounding the upper bicycle frame 21. U-clip 38 is bolted to the support member 37 at its bottom end. In embodiments of the invention, a U-clip may also be attached at the upper end of the support member 37 and surround the leg 11.

In the embodiment shown in FIG. 3, the support member is bolted to the leg 11 at a lower position than that shown in FIG. 2, and extends to the lower bicycle frame member 24 which extends from the rear wheel axle 18 to the pedal shaft section of the bicycle frame 20. The U-clips 38 allow the installation of the bicycle training device at a variety of angles because they may be loosened to slide along the bicycle frame 20, and then tightened in the desired position. The rearward tilt angle 22 may be adjusted in this manner with the rear axle bolts loosened and then retightened.

As shown in FIG. 4, the bottom end of the legs 11 and 12 may have flattened ends 40 and be provided with holes 39 of the same or different diameter to facilitate the attachment of the device 10 to the rear axle 18 of the bicycle. The flattened ends may also extend a sufficient distance to permit attachment of a support member 37. Thus, a support member 37 may be bolted to the flat portion of a leg 11, 12. A plurality of holes may be provided in the flat portion for attachment of the support member 37 at different positions to provide a plurality of rearward tilt angles 22.

When viewed from the rear of the bicycle, the legs 11 and 12 of the bicycle training device 10 may be substantially parallel as shown in FIGS. 2 and 3, or they may extend outward at their tops, as shown in FIG. 6. The leg tilt angle 43 may be from about 0° to about 20°, depending upon the desired width of the U-shaped handle 30. Adjusting the leg tilt angle 43, for example, with telescoping handle portions, may be useful alone or in combination with adjusting the rearward tilt angle 22, shown in FIG. 1, to allow the trainer or user to avoid contact with a bicycle having training wheels 14 installed by moving the gripping areas outward and/or backward.

In embodiments of the invention, one or more cross bars or cross members 45 may connect the two legs 11, 12 such as shown in FIG. 6. The cross bar 45 may be fixedly attached to the legs 11, 12 by means of screws 47 or other fastening means such as bolts or U-clips. The cross bar 45 may be used to prevent relative movement between the legs 11 and 12 and to provide torsional stability so as to permit the use of thinner legs 11, 12 or legs 11, 12 with smaller cross-sections. Additionally, the cross bar 45 may be used for the attachment of accessories such as a reflector, head or back cushion, handbag, tool bag, lunch bag, or the like. The cross bar 45 may be connected to the legs 11 and 12 in a substantially horizontal position or at an angle to the horizontal. Cross bar attachment is preferably located at one or more points between about 25% and 75% of the length of the legs 11, 12.

The bicycle training device 10 of the invention, in combination with the bicycle allows a riding person to be supported by a non-riding person or trainer. The trainer or user may exert a force upon the device, when required, which prevents undesired movement or tipping of the bicycle, resulting in the rider developing the balance and steering skills required to successfully guide the bicycle.

What is claimed is:

1. A bicycle training device in combination with a bicycle having a frame and a rear axle, the device comprising:

two rigid legs, each comprising a bottom end, a top end, and a front side for facing the forward direction of travel of a bicycle, said bottom ends adapted to be attached in a fixed position to the frame of the bicycle on opposite sides of the rear axle of the bicycle;

two rigid curved portions, each curved portion comprising a radius of curvature, a top end and a bottom end, and each curved portion being connected, at its bottom end, to the top end of one of said legs and defining a forwardly disposed curvature angle, with respect to said legs, and;

a rigid U-shaped handle portion comprising two ends, each end being connected to the top end of one of said curved portions, said U-shaped handle portion being forwardly disposed, with respect to said legs, at said curvature angle.

2. A bicycle training device in combination with a bicycle as claimed in claim 1 further comprising means for adjusting the length of each of said legs.

3. A bicycle training device in combination with a bicycle as claimed in claim 2 wherein each of said bottom ends is flat and comprises a plurality of holes through which the rear axle may be inserted for fixed attachment to the bicycle frame.

4. A bicycle training device in combination with a bicycle as claimed in claim 1 wherein at least a portion of said bicycle training device is covered with a flexible, cushioning material whereby gripping of said device is improved.

5. A bicycle training device in combination with a bicycle as claimed in claim 1 further comprising at least one support member attached proximate the bottom portion of at least one of said legs, said at least one support member extending to and being attached to the bicycle frame.

6. A bicycle training device in combination with a bicycle as claimed in claim 1 wherein said curvature angle is from about 20° to about 90°.

7. A bicycle training device in combination with a bicycle as claimed in claim 1 wherein said radius of curvature is from about 1 inch to about 10 inches.

8. A bicycle training device in combination with a bicycle as claimed in claim 1 wherein said U-shaped handle, said curved portions and said legs are tubular in shape and are integral.

9. A bicycle training device in combination with a bicycle as claimed in claim 1 wherein said rigid legs, said rigid curved portions and said rigid U-shaped handle are integral, forming a one-piece bicycle training device.

10. In combination with a bicycle having a frame including a rear wheel axle and a front wheel axle, a bicycle training device for a riding person to be supported by a non-riding person exerting a force upon said device, when required, to prevent an undesired movement of said bicycle, the device comprising:

two legs, each comprising a bottom end, a top end, and a front side facing the forward direction of travel of the bicycle, said bottom ends adapted to be attached in a fixed position to the bicycle frame on opposite sides of the rear wheel axle;

two curved portions, each curved portion comprising a radius of curvature, a top end and a bottom end, and each curved portion being connected, at its bottom end, to the top end of one of said legs and defining a forwardly disposed curvature angle, with respect to said legs, and;

a U-shaped handle portion comprising two ends, each end being connected to the top end of one of said curved portions, said U-shaped handle portion being forwardly disposed, with respect to said legs, at said curvature angle.

11. A bicycle training device as claimed in claim 10 further comprising means for adjusting the length of each of said legs.

12. A bicycle training device as claimed in claim 11 wherein each of said bottom ends is flat and comprises a plurality of holes through which the rear axle may be inserted for fixed attachment to the bicycle frame.

13. A bicycle training device as claimed in claim 10 wherein at least a portion of said bicycle training device is covered with a flexible, cushioning material whereby gripping of said device is improved.

14. A bicycle training device as claimed in claim 13 wherein said flexible, cushioning material comprises foam rubber.

15. A bicycle training device as claimed in claim 10 further comprising at least one support member attached proximate the bottom portion of at least one of said legs, said at least one support member extending to and being attached to the bicycle frame.

16. A bicycle training device as claimed in claim 10 wherein said curvature angle is from about 20° to about 90°.

17. A bicycle training device as claimed in claim 10 wherein the radius of curvature is from about 1 inch to about 10 inches.

18. A bicycle training device as claimed in claim 10 wherein said U-shaped handle, said curved portions and said legs are tubular in shape and are integral.

19. In combination with a bicycle having a frame including a rear wheel axle and a front wheel axle, a bicycle training device for a riding person to be supported by a non-riding person exerting a force upon said device, when required, to prevent an undesired movement of said bicycle, the device comprising:

two tubular adjustable legs, each comprising a flattened bottom end and a top end, said bottom ends adapted to be attached in a fixed position to the bicycle frame on opposite sides of the rear wheel axle;

two tubular curved portions, each curved portion comprising a radius of curvature of from about 1 inch to about 10 inches, a top end and a bottom end, and each curved portion being connected, at its bottom end, to the top end of one of said legs and defining a forwardly disposed curvature angle of from about 20° to about 90°, with respect to said legs;

a tubular U-shaped handle portion comprising two ends, each end being connected to the top end of one of said curved portions, said U-shaped handle portion being forwardly disposed, with respect to said legs, at said curvature angle; and at least one support member attached proximate the bottom portion of at least one of said legs, said at least one support member extending to and being attached to the bicycle frame;

wherein the height of the attached device is adjustable relative to a reference point at ground level, and wherein said bicycle training device is covered with a flexible, cushioning material comprising foam rubber whereby gripping of said device is improved.

20. The combination of claim 19 wherein two support members are attached to said bicycle frame, each support member comprising a U-shaped clip which fits around and is secured to said frame, and an elongated member having a plurality of holes along its length, each elongated member being fixedly attached to said U-shaped clip at one end and fixedly attached to said flattened portion of one of said legs at its other end, and wherein said legs, said curved portions, and said handle portions are integral.

* * * * *